United States Patent
Kovach et al.

Patent Number: 5,129,190
Date of Patent: Jul. 14, 1992

[54] MACHINING AND APPARATUS

[75] Inventors: Joseph A. Kovach, Aurora; John M. Burke, Kirtland, both of Ohio

[73] Assignee: Eaton Corporation, Cleveland, Ohio

[21] Appl. No.: 606,979

[22] Filed: Oct. 31, 1990

[51] Int. Cl.$^5$ .............................. B24P 1/00
[52] U.S. Cl. ........................ 51/322; 51/266; 51/356; 82/900
[58] Field of Search ............ 51/322, 267, 266, 356; 82/1.11, 900

[56] References Cited

U.S. PATENT DOCUMENTS

| | | | |
|---|---|---|---|
| 3,768,212 | 10/1973 | Mackay | 51/82 R |
| 4,080,952 | 3/1978 | Wain | 51/267 |
| 4,621,547 | 11/1986 | Yankoff | 82/1 C |
| 4,657,068 | 4/1987 | Peltz | 51/266 |
| 4,695,208 | 9/1987 | Yankoff | 407/106 |
| 4,829,859 | 5/1989 | Yankoff | 82/1 |

Primary Examiner—Frederick R. Schmidt
Assistant Examiner—Lawrence Cruz
Attorney, Agent, or Firm—A. E. Chrow

[57] ABSTRACT

Method and apparatus are provided for machining processes involving the generation of frictional heat in which the workpiece is contacted by a coolant whose viscosity progressively increases with decreasing temperature and by a pressurized fluid that, upon expansion while undergoing a reduction in pressure, absorbs heat and cools the coolant and increases its viscosity to provide a consistency that enhances its lubricity to minimize the generation of frictional heat during the machining process while enhancing conductive heat transfer into the machining tool.

15 Claims, 3 Drawing Sheets

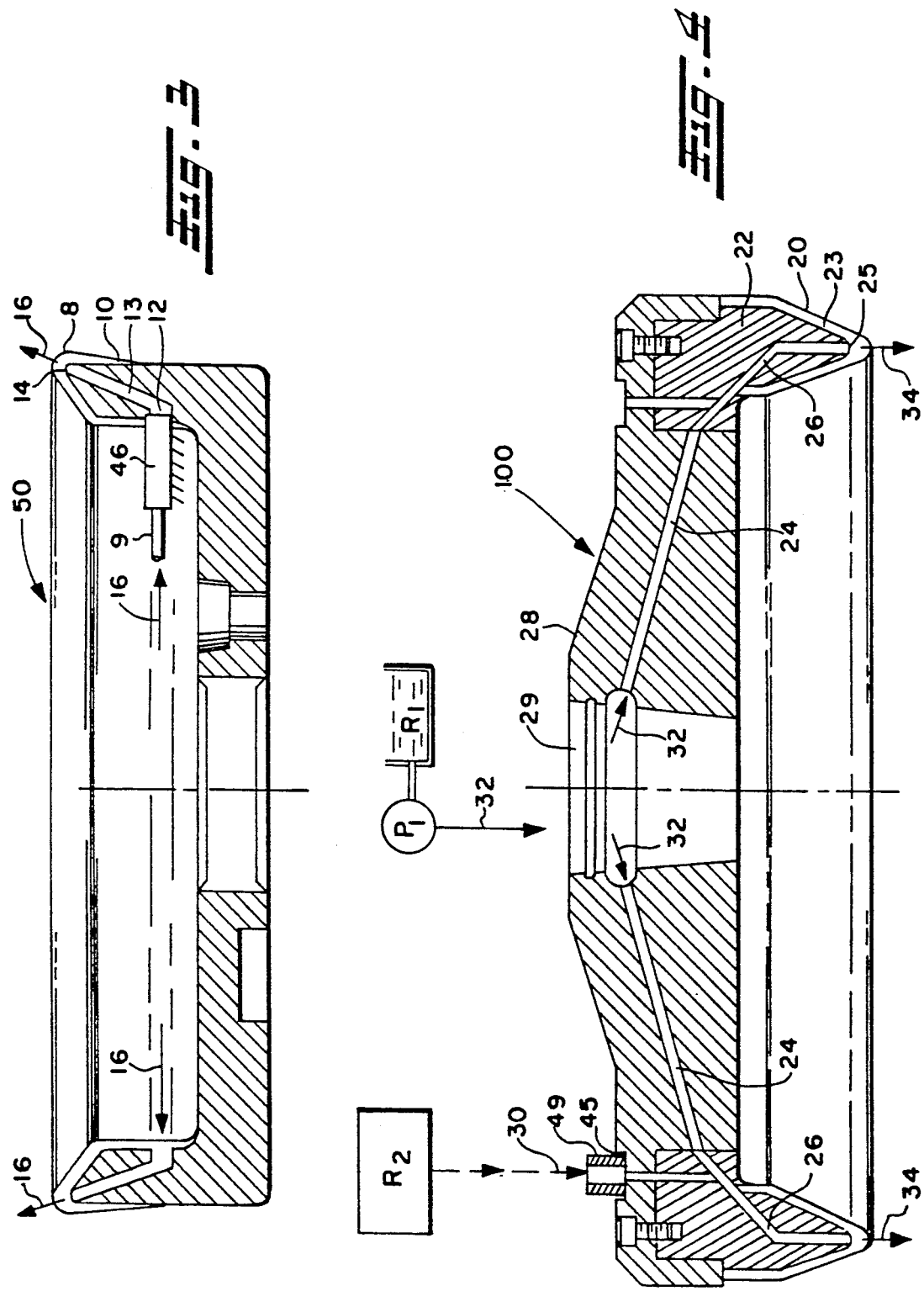

MACHINING AND APPARATUS

INTRODUCTION

This invention relates generally to a method and apparatus for machining a workpiece at high speed while minimizing frictional heat generated during the machining process and more particularly to a method and apparatus that utilizes a temperature responsive coolant cooled by an expanding pressurized fluid such that its physical lubricity progressively increases with decreasing temperature to a consistency operative to reduce frictional heat generated during the machining process and to enhance conductive heat transfer into the machining tool.

BACKGROUND OF THE INVENTION

Generation of frictional heat during machining processes, particularly during the high speed machining of metal, has been a problem for many years and is even more so in light of the desire for higher machining speeds in today's competitive market place.

Frictional heat build-up during the machining process can create a plethora of problems including distortion and degradation (including burning) of either or both the workpiece and the machining tool as well as significantly shorten tool life resulting in substantially increased costs associated with machining the particular part.

One machining process that is particularly prone to heat generation is grinding of which but one example is the grinding of vehicle differential ring gears that is hereinafter described in greater detail as an illustrative example.

Although a certain degree of control of heat build-up during the machining process can be accomplished by the use of petroleum and non-petroleum based metal working fluids hereinafter called coolants well known to those skilled in the art, such coolants have heretofor normally been used at or near ambient temperature and, when cooled, have been cooled down to near ambient temperature for re-use.

The only known instance of attempting to cool a workpiece substantially below ambient temperature is where pressurized carbon dioxide in the liquid phase has been injected into a water stream to produce a mixture of water and ice particles that is then directed onto the workpiece being machined such as disclosed in U.S. Pat. No. 4,809,859, the disclosure of which is incorporated by reference. Although such may in certain cases be used to advantage, the ice and water mixture would not possess attractive lubricity characteristics; would not possess progressively increasing lubricity characteristics with decreasing temperature; and could conceivably lead to corrosion of the workpiece being machined especially ferrous alloys.

Others have attempted to inject the coolant close to the location at which the machining tool engages the workpiece to enhance cooling efficiency such as disclosed in U.S. Pat. No. 4,621,547 where the coolant is directed at high velocity at the region of the workpiece being machined and U.S. Pat. 4,695,208 where the machining tool includes fluid channels for conveying the coolant to the point of engagement with the workpiece, the disclosures both of which are included herein by reference.

In contrast, the present invention eliminates the problems associated with the water and ice mixture previously described by cooling temperature responsive coolants to below ambient temperature to provide a consistency that greatly enhances its lubricating ability enabling substantially higher machining speeds while minimizing frictional heat build up during the machining process and enhancing conductive heat transfer into the machining tool.

In many instances the preferred coolant consistency may be virtually a solid-like film to provide the degree of lubricity desired to minimize frictional heat generation during high speed machining operations. Although paste lubricants have been used in the past for certain machining operations, such pastes have commonly been difficult to apply; have characteristically been unable to be re-used because of inability to separate machined particles and other debris accumulated during the machining operation; and are difficult to apply in a repeatably uniform manner.

In contrast, the cooled coolants of the present invention are able to be applied separately or together, commonly at ambient temperature as fluid/liquids or gas/liquids and, as such, can be applied with a high degree of uniform repeatability and, upon returning to ambient temperature, can be cleaned (such as by filtering) for re-use.

SUMMARY OF THE INVENTION

Accordingly, it is an object of this invention to provide a method and apparatus enabling high speed machining while minimizing frictional heat build up during the machining process.

It is another object of this invention to provide a method and apparatus for machining a workpiece that is operative to cool a temperature responsive coolant below ambient temperature to enhance is lubricity and thereby substantially reduce frictional heat build up during the machining process.

BRIEF DESCRIPTION OF THE DRAWINGS

FIG. 3 is a cross-sectional view taken along view line 3—3 of FIG. 2;

FIG. 4 is a central cross-sectional view of an embodiment of a plunge type grinding wheel 100;

DESCRIPTION OF SOME PREFERRED EMBODIMENTS

Figure 1:
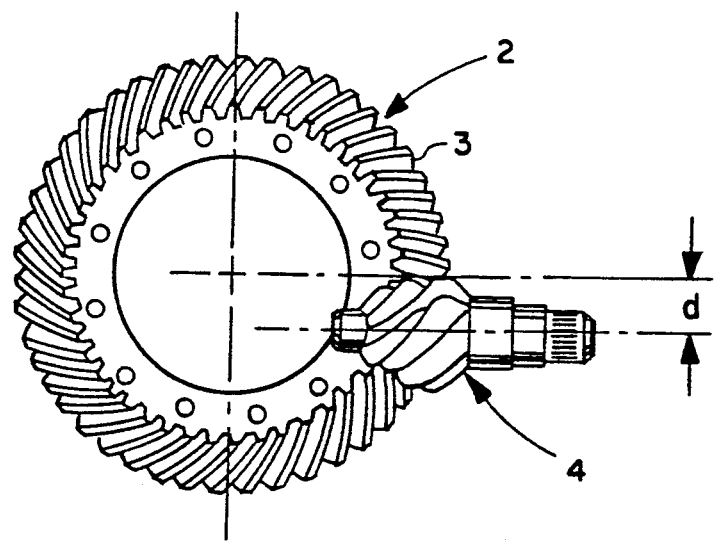
FIG. 1 is a plan view of a vehicle differential ring gear 2 driven by a pinion gear 4.

An exemplary workpiece for use with the method and apparatus of the invention is vehicle differential ring gear 2 of FIG. 1 that is rotationally driven by pinion gear 4 to provide torque to the vehicle's wheel axles.

One of the machining processes highly susceptable to frictional heat build-up to which ring gear 2 is subjected is the finish grinding of teeth 3 which is commonly done with a standard flare cup type grinding wheel 50 using Gleason Equipment well know in the art as described, for example, in U.S. Pat. No. 4,949,456, assigned to the assignee of this invention and the disclosure of which is incorporated herein by reference.

Another type of grinding wheel that may be utilized to finish grind teeth 3 of ring gear 2 is plunge type grinding wheel 100 hereinafter described in greater detail with respect to FIG. 4.

As described in U.S. Pat. No. 4,949,456, differential ring gears have a plurality of teeth that are characteristically either of the spiral bevel or hypoid type that are circumferentially evenly spaced about the central rotational axis of the gear and face in a direction acutely away therefrom. Teeth 3 of ring gear 2 are hypoid type teeth that are curved such that pinion gear 4 is offset from the central rotational axis of ring gear 2 by the distance "d". The distance "d" would be zero in instances where teeth 3 of ring gear 2 are of the spiral bevel type.

The method and apparatus of the invention involves directing a coolant onto the workpiece whose lubricity progressively increases with decreasing temperature and contacting the coolant with a pressurized fluid that, upon expanding, cools the coolant sufficiently to increase the coolant's physical lubricity to a consistency operative to enhance the coolant's ability to lubricate and reduce frictional heat by a desired amount. In many machining operations, particularly in grinding operations, it is preferable that the coolant be cooled to a paste-like consistency or even to virtually a solid-like lubricant film as previously described.

"Physical lubricity" (hereinafter called lubricity) is the ability of a material to generate a lubricating film whereas chemical lubricity is a term characteristically associated with materials containing sulfur, chlorine or phosphorus that are temperature activated lubricants. The term "coolant", as used in connection with the method and apparatus of the present invention includes petroleum and non-petroleum based coolants, whose physical lubricity progressively increases with decreasing temperature. The term "coolant" as used in connection with the method and apparatus of the present invention does not include water alone of which a portion is converted to ice particles as disclosed in previously described U.S. Pat. No. 4,829,859 for such does not possess the characteristic of a progressively increasing lubricity with decreasing temperature especially since water is a solid at 32° F. at standard atmospheric pressure.

More particularly, petroleum based coolants suitable for use in connection with present invention include oil and oil emulsions and non-petroleum based coolants which includes synthetic coolants that are water miscible as well as constant phase coolants that are not water miscible such as polyol-esters; poly (alpha-olefins); and triglycerides well known to those skilled in the art of coolants used in connection with machining operations.

Another advantage of the present invention is the ability to cool the coolant below the freezing point of water such as when the coolant is a petroleum based coolant such as oil having a pour point below $-35°$ F. and are likely to become pastey at about $-60°$ F. or when the coolant is a polyol-ester or poly (alpha-olefin) characteristically able to remain liquid to below $-60°$ F. and in some instances to below $-80°$ F. The decrease in temperature increases the viscosity logrythmically consistant with the specific characteristic of the temperature viscosity index of the coolant. Increases in viscosity are consistant with increases in film strength which provides an increase in physical lubricity of the applied coolant.

The ability of the coolants in the present invention to exhibit lubricating ability below the freezing point of water is of great advantage for it enables a substantially greater temperature gradient ($\Delta T$) to occur between the interior and the surface of the workpiece that enhances heat conduction away from the region of the workpiece being machined which enables even faster machining to occur.

The term "pressurized fluid" as used in connection with the method and apparatus of the present invention includes pressurized liquids and gases, that upon expanding, while undergoing a reduction in pressure, absorb heat according to their respective latent heat of vaporization characteristics. A preferred pressurized fluid is carbon dioxide in the liquid phase.

The present invention includes instances where the coolant and pressurized fluid are separately directed onto the workpiece or are first premixed and then directed onto the workpiece during the machining process. Either one or both of the coolant and pressurized fluid are preferably conveyed through fluid passageways or channel(s) in the machining tool so as to engage the workpiece as close to the machining point as possible such as for example where grooves 10 of teeth 8 of grinding wheel 50 of FIG. 2 include at least one fluid channel 13 (FIG. 3) therein for conveying a selected one of the coolant, pressurized fluid, and mixtures thereof (referenced by numeral 16) from an exit 14 to the workpiece as shown in FIG. 3. In such instances, grinding wheel 50 would preferably include an annular groove 12 about its inner periphery operative to distribute the selected one of coolant, pressured fluid, and mixtures thereof to other grooves in wheel 50 that include fluid passageways or channels such as channel 13.

In cases where channel 13 is used to convey either the coolant or the pressurized fluid onto the workpiece then the other would be conveyed by other delivery means such as by directing a stream onto the workpiece through suitable conduits or the like.

Figure 5:
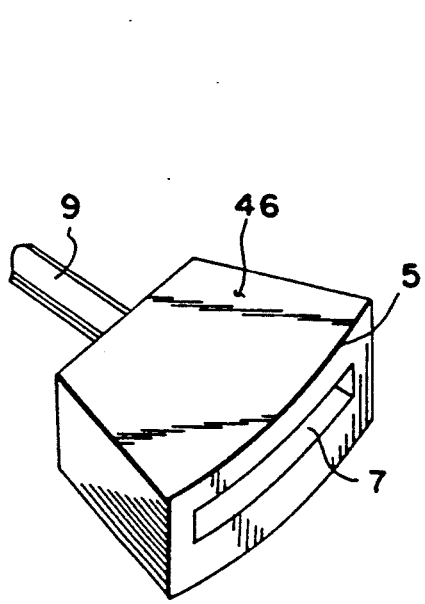
FIG. 5 is a perspective view of an embodiment of an inducer shoe particularly suitable for use in the invention.

Also shown in FIGS. 3 and 5 is an embodiment of an inducer shoe 46 that is of particular advantage in introducing either or both the coolant and pressurized fluid into groove 12 for distribution through channels 13 between teeth 8 to the workpiece being machined in a highly efficient manner.

Inducer shoe 46 is a stationarily mounted device within the inner periphery of grinding wheel 50 in a suitable manner and has an arcuate face 5 that is adapted to conform to the curvature of groove 12 and has an opening or window 7 that is in registration with groove 12 when inducer shoe 46 is mounted within the inner periphery of grinding wheel 50 so that either or both the coolant and pressurized fluid is able to exit therefrom directly into groove 12 for a distribution after having entered inducer shoe 46 through a suitable conduit connection referenced by numeral 9.

Another embodiment of an inducer shoe 49 is shown in FIG. 4. In this case, an annular groove 45 is disposed in the top side (opposite side of wheel 100 side facing way from teeth 20) and inducer shoe 49 is secured against movement relative grinding wheel 50 and includes an opening (not referenced) in registration with groove 45 for conveyance of either or both coolant and pressurized fluid thereto. In this case, the face of inducer shoe 49 is curved to conform with the curvature of groove 45.

Plunge type grinding wheel 100 of FIG. 4 is a cup type wheel illustrating how a mixture of coolant and pressurized fluid can be delivered to the workpiece. Grinding wheel 100 also illustrates how additional elements can be utilized to increase rotational speed of the grinding wheel such as by making the body of the wheel, all except for teeth 20, from a light weight high strength material such as titanium in addition to thickening the central hub region such as referenced by numeral 28 to enhance strength for high speed rotation. Teeth 20 are preferably secured to the body as inserts of standard steel that are coated with a layer 23 of cubic boron nitride material that, in addition to providing superior grinding surface characteristics (particularly between about 60 to 180 grit), has a thermal diffusivity factor of about 80 times that of copper and a thermal conductivity of about five times the copper and thus is able to markedly enhance conductance of heat away from the machining location. Another material now able to be effectively used for coating or layer 23 is diamond that heretofor has required lower speed grinding because of frictional heat in conjunction with iron contained in the workpiece has catalyzed oxidation or graphitization of the diamond leading to embrittlement and early failure. Diamond, when used as a cutting or abrasive coating in conjunction with the present invention, is greatly advantageous for it is harder and has greater heat conductivity than cubic boron nitride.

Plunge type grinding wheel 100 of FIG. 4 has a fluid channel or passageway 26 extending through the region 22 between teeth 20 that includes the groove at which exit 25 is located. Channel 26 is operative to receive pressurized fluid 30 from pressure reservoir "$R_2$" that may, for example, be pressurized tanks of carbon dioxide in the liquid phase.

Grinding wheel 100 also includes fluid channels or passageways 32 that extend from bore 29 and intersect channel 26 as shown in FIG. 4. Channels 24 are operative to convey coolant therethrough referenced by numeral 32 that is preferably pumped by pump "$P_1$" from reservoir "$R_1$" and joins pressurized fluid 30 within grinding wheel 100 and exits at exit 25 as a mixture of the coolant 32 and pressurized fluid 30 referenced by numeral 34. Of course, the reverse may also be utilized where the coolant enters through channel 26 and the pressurized fluid enters through channel 24.

Figure 2:
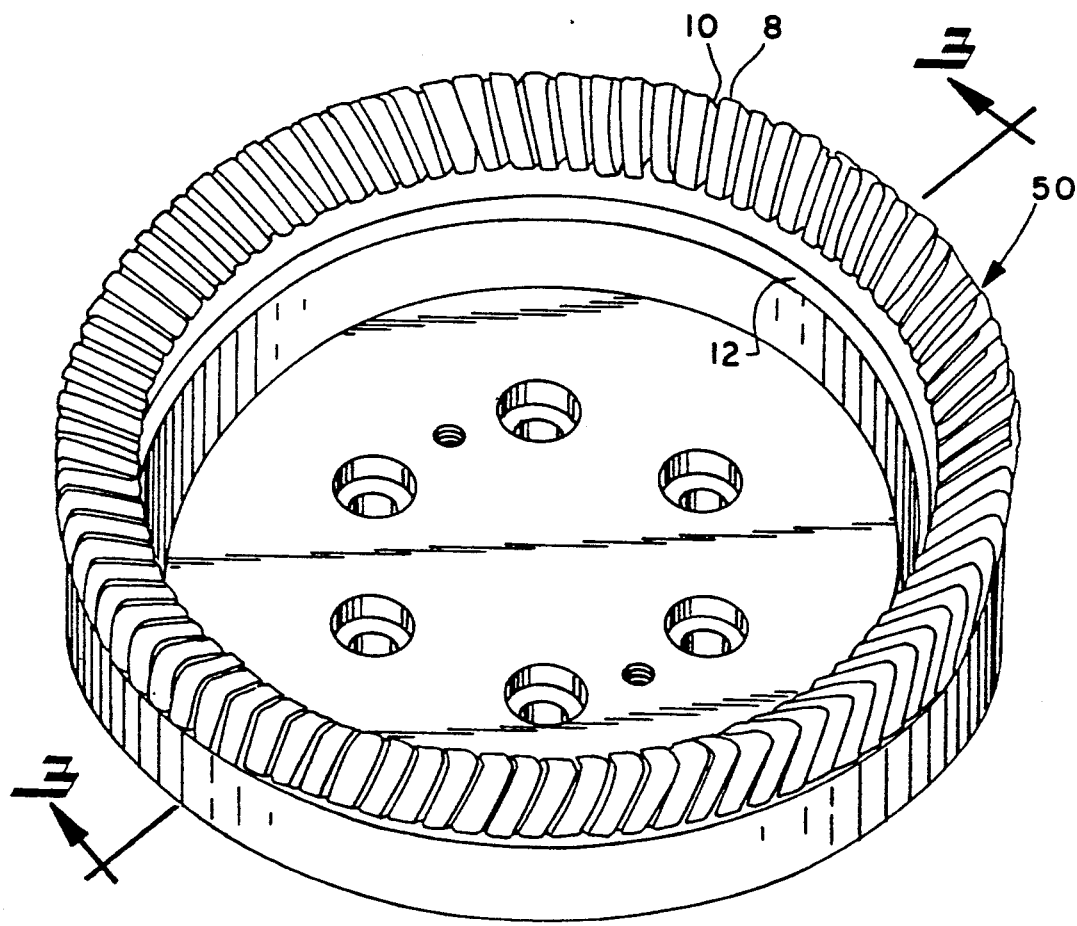
FIG. 2 is a perspective view of a flare cup type grinding wheel 50 modified in accordance with the invention and operative to grind the teeth of the ring gear of FIG. 1.
Figure 6:
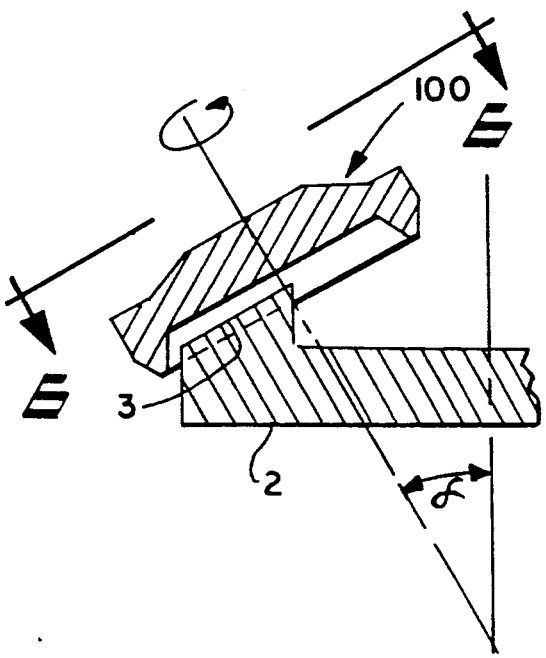
FIG. 6 is a partial schematic side view of positional relationship between grinding wheel 100 of FIG. 4 and ring gear 2 of FIG. 1.

FIG. 6 illustrates the manner in which the central rotational axis of the grinding wheel 100 of FIG. 2 is characteristically oriented at an angle alpha from the central rotational axis of ring gear 2 of FIG. 1 for grinding teeth 3 since the wheel must clear the teeth diametrically opposite to the tooth being ground because of the tooth path curvature involved.

Figure 7:
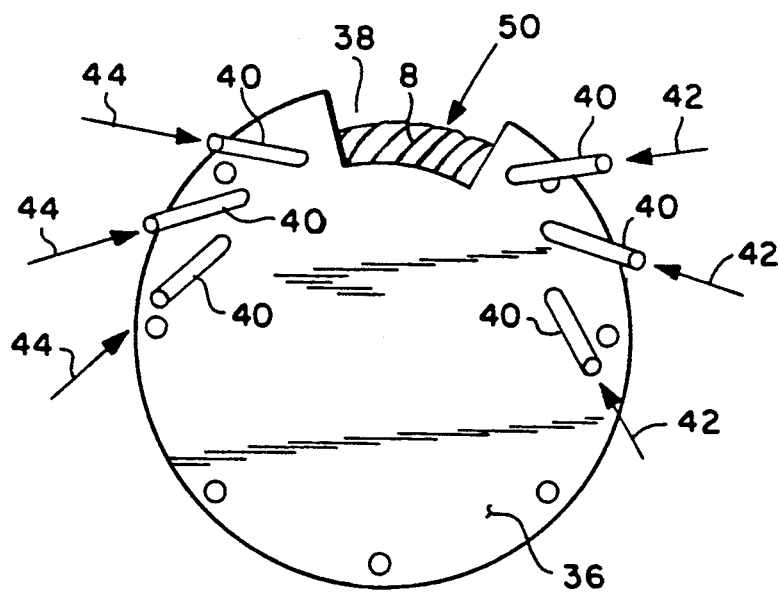
FIG. 7 is a top view of a shroud 36 taken along view line 6—6 of FIG. 6.

FIG. 7 is illustrative of how a shrouding member 36 may be utilized to enclose grinding wheel 50. Shroud member 36 is an enclosure, preferably an insulated enclosure, that shrouds the region in which the coolant is cooled by the expanding pressurized fluid on the workpiece. Shroud 36 preferably includes a window 38 exposing a portion of teeth 8 of grinding wheel 50 that are exposed for grinding the workpiece. In this case shroud 36 includes a plurality of conduits 40 for conveying coolant 42 and pressurized fluid 44 or mixtures thereof onto teeth 8 within shroud 36 for the cooling of the workpiece.

Thus the invention provides for the delivery of coolant as defined herein and pressurized fluid, such as carbon dioxide in the liquid phase, and/or mixtures thereof, onto the workpiece such that, upon expansion while undergoing a reduction in pressure, cools and progressively increases the coolant's lubricity to a consistency operative to minimize frictional heat build-up during the machining process.

What is claimed is:

1. A method of reducing frictional generated while machining a workpiece, said method comprising the steps of:
   (a) directing a coolant onto the workpiece whose lubricity progressively increases with decreasing temperature;
   (b) contacting the coolant of step (a) with pressurized fluid that, upon expansion while undergoing reduction in pressure absorbs heat and cools the coolant sufficiently to increase the coolant's lubricity to a consistency operative to enhance the coolant's ability to reduce the frictional heat generated during the machining process.

2. The method of claim 1 wherein the pressurized fluid is carbon dioxide.

3. The method of claim 1 wherein the machining tool is a grinding tool.

4. The method of claim 1 wherein the coolant consistency of step (b) is a paste-like consistency.

5. The method of claim 1 wherein the workpiece is a vehicle differential ring gear and the machining tool is a grinding tool.

6. The method of claim 1 wherein the coolant is cooled by the expanding fluid in a region that is enclosed by a shroud.

7. The method of claim 1 wherein the workpiece is machined with a machining tool that includes at least one fluid channel therein operative to convey a selected one of the coolant, pressurized fluid, and mixtures thereof, onto the workpiece.

8. The method of claim 1 wherein the workpiece is a vehicle differential ring gear and the machining tool is a grinding tool having a plurality of substantially equispaced circumferential teeth respectively separated from each other by a groove at least one of which includes an exit of a fluid channel operative to convey a selected one of the coolant, pressurized fluid, and mixtures thereof, onto the workpiece.

9. The method of claim 1 wherein the workpiece is machined with a machining tool that includes a cubic boron nitride coating.

10. The method of claim 1 wherein the workpiece is machined with a machining tool that includes a diamond coating.

11. Apparatus for reducing friction heat while machining a workpiece, said apparatus comprising:
    coolant delivery means for conveying a coolant onto the workpiece whose lubricity progressively increases with decreasing temperature; and
    pressurized fluid delivery means for contacting the coolant with a pressurized fluid that, upon expansion while undergoing a pressure reduction, absorbs heat and cools the coolant sufficiently to increase the coolant's lubricity to a consistency operative to enhance the coolant's ability to reduce the frictional heat generated during the machining process.

12. The apparatus of claim 11 including shrouding means operative to shroud the region where the coolant is cooled by the expanding fluid.

13. The method of claim 8 wherein the grinding tool further includes an annular groove extending thereabout that is in fluid communication with the channel and in registration therewith is an inducer shoe secured against movement relative the grinding tool and having an arcuate surface adapted to conform to the groove having a window therein operative to convey the selected one of the coolant, pressurized fluid, and mixtures thereof, into the annular groove.

14. The apparatus of claim 11 wherein the machining tool is a grinding tool having a plurality of substantially equi-spaced circumferential teeth respectively separated from each other by a groove at least one of which includes an exit of a fluid channel extending through the machining tool and operative to convey a selected one of the coolant, pressurized fluid, and mixtures thereof into the workpiece.

15. The apparatus of claim 14 wherein the grinding tool further includes an annular groove that is in fluid communication with the channels and in registration therewith is an inducer shoe secured against movement relative the grinding wheel and having an arcuate surface adapted to conform to the annular groove having a window therein operative to convey the selected one of the coolant, pressurized fluid, and mixtures thereof into the annular groove.

* * * * *

UNITED STATES PATENT AND TRADEMARK OFFICE
CERTIFICATE OF CORRECTION

PATENT NO. : 5,129,190

DATED : July 14, 1992

INVENTOR(S) : Kovach et al

It is certified that error appears in the above-identified patent and that said Letters Patent is hereby corrected as shown below:

In the title, cover page (54) and at the top of Column 1, insert --METHOD-- between "MACHINING" AND "APPARATUS".

Column 6, line 56 (line 1 of claim 11), delete "friction" and insert --frictional-- in its place.

Signed and Sealed this

Ninth Day of November, 1993

Attest:

BRUCE LEHMAN

Attesting Officer

Commissioner of Patents and Trademarks